J. CUTHBERT.
METERING PANEL.
APPLICATION FILED OCT. 12, 1915. RENEWED MAY 3, 1920.
1,360,371.
Patented Nov. 30, 1920.
4 SHEETS—SHEET 1.
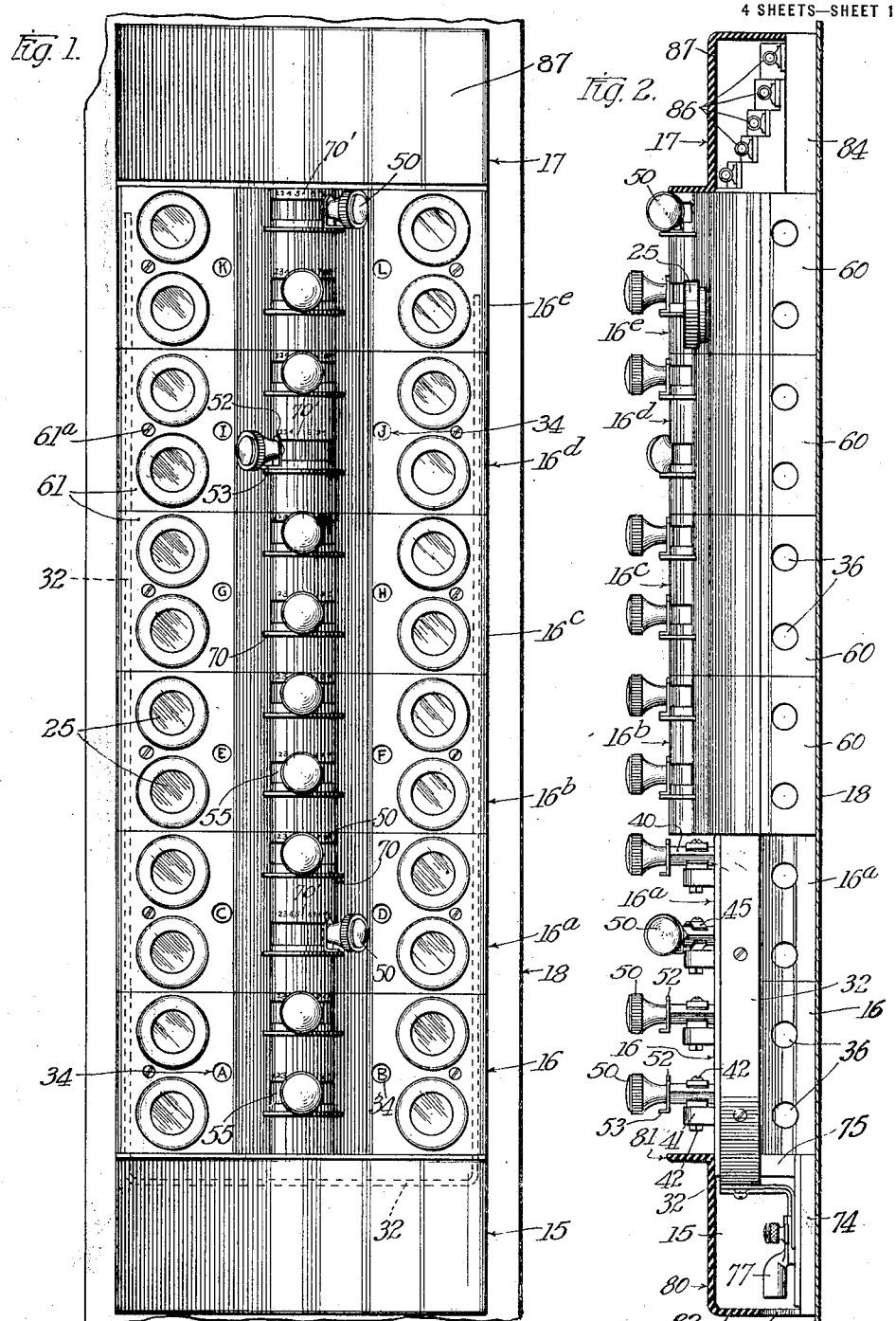
Witnesses:
Robert H. Weir
Arthur W. Carbry
Inventor
John Cuthbert

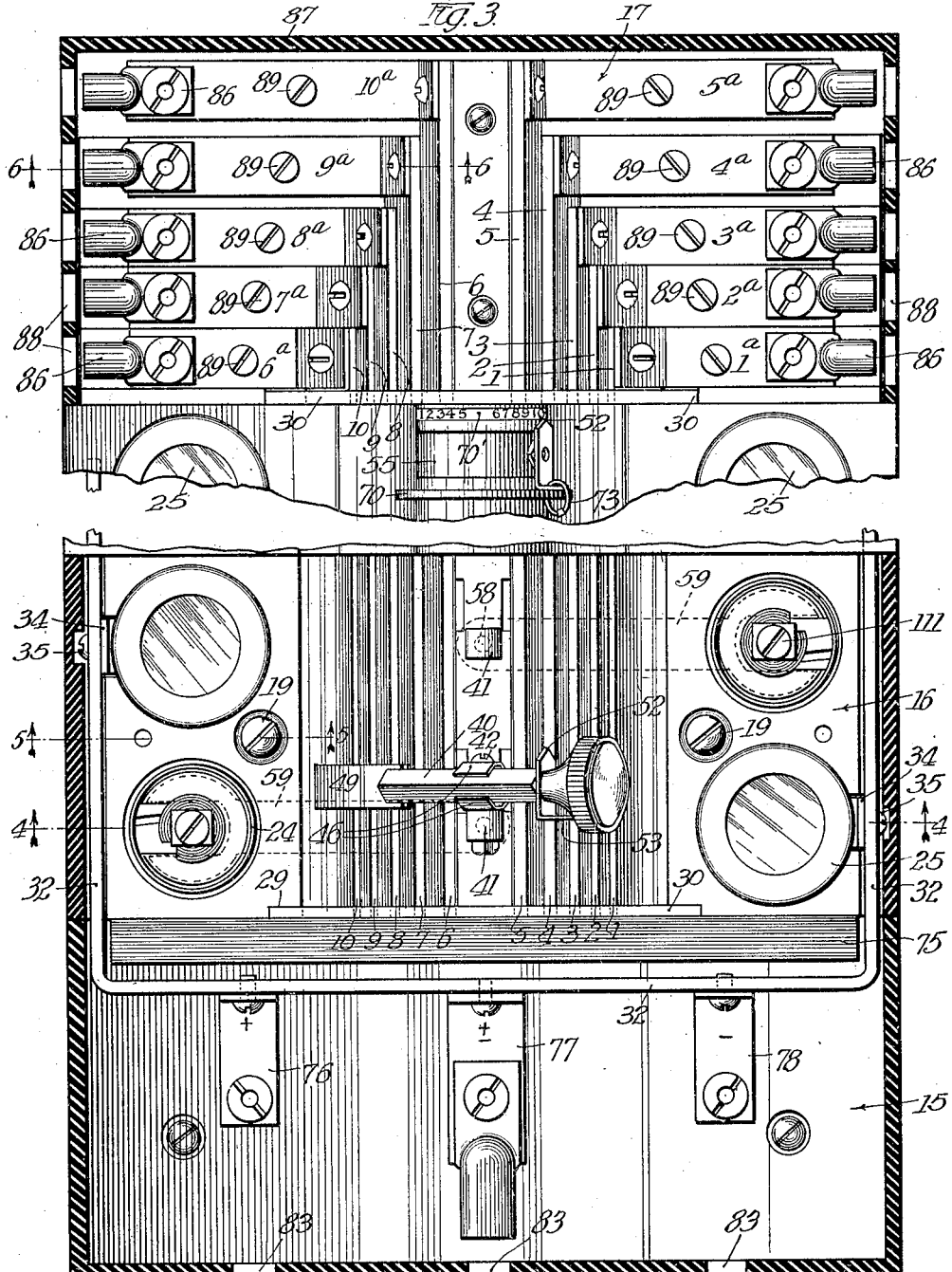

J. CUTHBERT.
METERING PANEL.
APPLICATION FILED OCT. 12, 1915. RENEWED MAY 3, 1920.
1,360,371.
Patented Nov. 30, 1920.
4 SHEETS—SHEET 3.
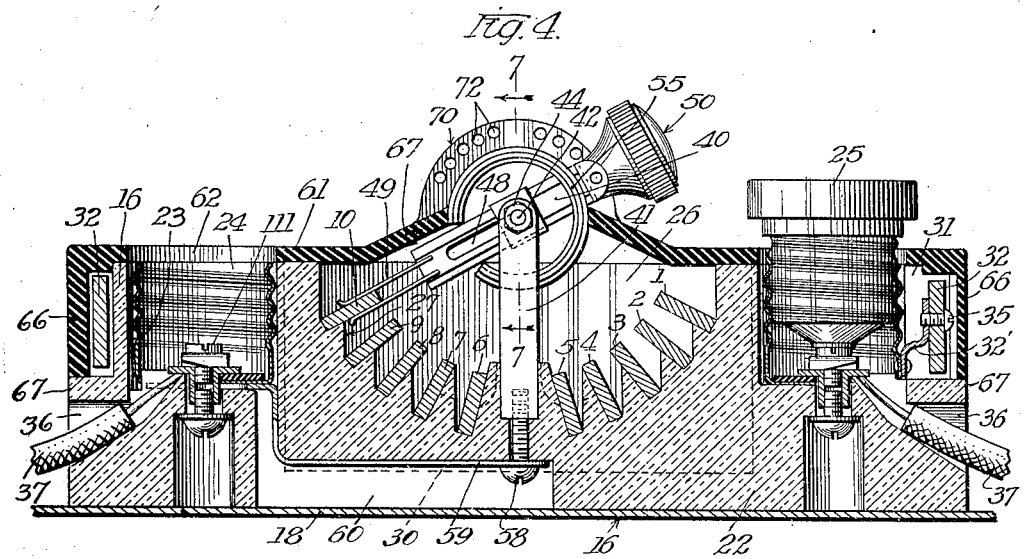
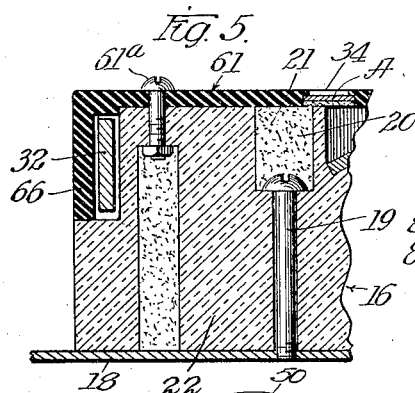
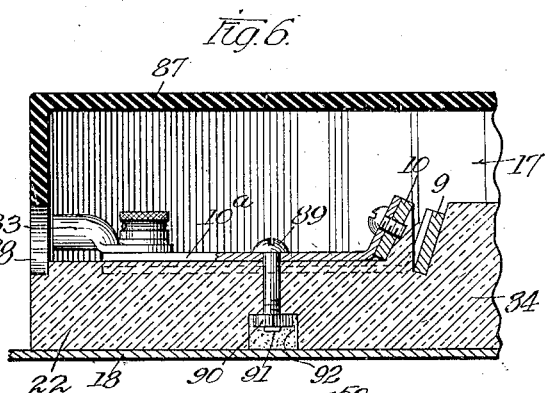
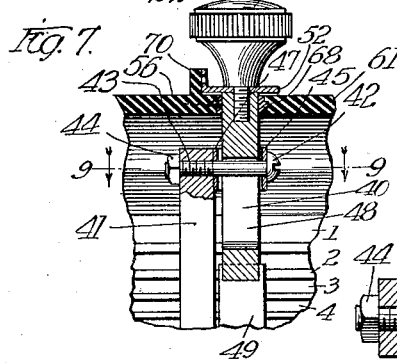
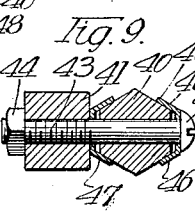
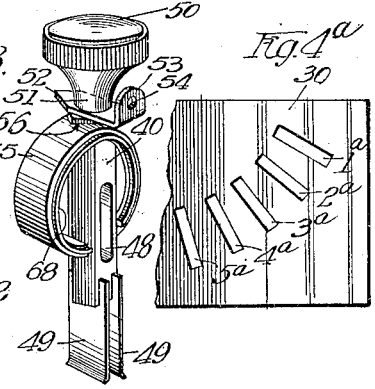
Inventor
John Cuthbert

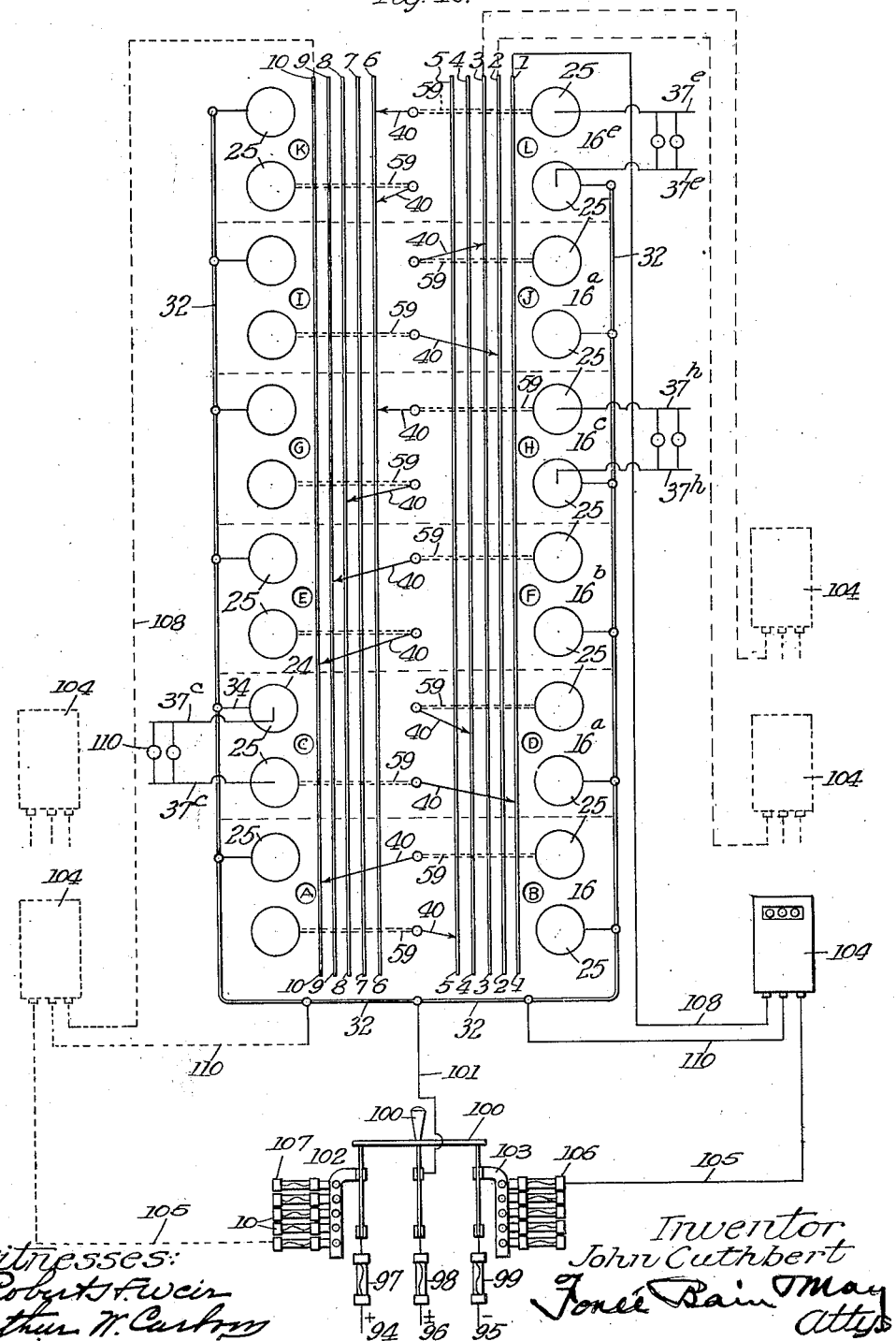

UNITED STATES PATENT OFFICE.

JOHN CUTHBERT, OF CHICAGO, ILLINOIS, ASSIGNOR TO JOHN CUTHBERT COMPANY, OF CHICAGO, ILLINOIS, A CORPORATION.

METERING-PANEL.

1,360,371.      Specification of Letters Patent.     Patented Nov. 30, 1920.

Application filed October 12, 1915, Serial No. 55,401. Renewed May 3, 1920. Serial No. 378,650.

*To all whom it may concern:*

Be it known that I, JOHN CUTHBERT, a citizen of the United States, residing at Chicago, in the county of Cook and State of Illinois, have invented certain new and useful Improvements in Metering-Panels, of which the following is a specification.

My invention relates to improvements in metering panels.

One of the objects of my invention is to provide an improved panel board whereby any branch circuit, or any number of grouped branch circuits may be quickly and independently connected to the distributing mains or bus bars through any given meter or any other similar transmitting device, associated with said board.

Another object of my invention is to provide a sectional board, each section arranged to accommodate two or more circuits, preferably in multiples of two, whereby a board of any given capacity may quickly be built by assembling a desired number of standard stock sections.

Another object of my invention is to provide an assemblage of parallel meter bars and switching means for each branch circuit coöperating therewith, whereby connection with any bar may be effected with any circuit without disturbing or affecting any other connection or circuit.

Still another object of my invention is to completely insulate and cover all of the electrically energizable conducting parts of the panel to protect said parts from dust and from contact by the operator.

Other and further objects of my invention will become readily apparent, to persons skilled in the art, from a consideration of the following description when taken in conjunction with the drawings wherein:—

Figure 1 is a front elevation of a composite, built-up panel board showing interfitting section covers overlying all of the live or energizable parts of the structure.

Fig. 2 is a side elevation showing parts in section, with the insulating covers of two of the sections removed.

Fig. 3 is an enlarged elevation similar to Fig. 1, showing parts of the covers in section, with other parts thereof removed, and showing only the terminal sections and one intermediate section of the board.

Fig. 4 is a transverse section of one of the board sections taken on line 4—4 of Fig. 3.

Fig. 4ª is an elevation of a bar spacing and retaining plate.

Fig. 5 is a section taken on line 5—5 of Fig. 3.

Fig. 6 is a section taken on line 6—6 of Fig. 3.

Fig. 7 is a section taken on line 7—7 of Fig. 4.

Fig. 8 is a perspective view of the switch member.

Fig. 9 is a section taken on line 9—9 of Fig. 7.

Fig. 10 is a diagram of circuits.

In all the views the same reference characters are employed to indicate similar parts.

The composite board, shown in Figs. 1 and 2 is made up of eight stock sections, the terminal sections 15 and 17 and the intermediate branch circuit sections 16—16$^e$ inclusive. The sections 16—16$^e$ are alike in every respect, the one being a duplicate of another. These sections will be alike and uniform in every essential detail, regardless of the number that may be required to build up a board of a given capacity. I will describe only one of the intermediate, fuse sections 16, and place reference characters on the other like sections with the respective letter exponents. The entire number of component sections are suitably mounted upon a back board 18, which is preferably a sheet of steel of proper dimensions. The sections are secured to the back board by any proper manner, sections 16 being attached thereto by means of screws 19 which pass through counterbored perforations 20, the upper end of the counter bore being filled with suitable insulating material, such as sealing wax, 21, or the like. Each section 16 is provided with two such screws, as clearly shown in Fig. 3. The body portion, or block 22 of sections 16 is preferably composed of porcelain, or other similar suitable insulating and relatively refractory material, capable of being cheaply molded or otherwise fashioned into the proper configuration for the purpose intended. Each of the porcelain blocks of sections 16, in the exemplification illustrated in the drawings, is provided with four depressions or recesses 23 to receive the screw threaded receptacle terminal shells 24, within which the fuse-containing plug 25 is to be inserted, as usual in devices of this general character. Two of such receptacles and fuse plugs are located upon each side of the median central line of the section to provide fuse protection for each limb of each branch circuit.

Each of the sections 16 has a central depression 26 extending through it and rising from the bottom of these depressions there are a series of projections 27, one for each meter bar, each having a radial face against which a meter bar is located. The meter bars 1 to 10 inclusive, are preferably of rectangular form in cross section, and are preferably of larger extent in their radial planes than in their circumferential planes. These bars I have indicated by numerals 1 to 5 respectively on one side of the transverse center of the assembled blocks and from 6 to 10 inclusive on the other side. The porcelain block 22 of section 16 is cut in at one of its ends, to provide a shallow recess, at 29, for a bar spacing and retaining plate 30. This plate is shown in place in dotted lines in Fig. 4 and a fragment of it is shown in elevation in Fig. 4$^a$. It is provided with a series of circumferentially extending uniformly spaced apart radially positioned oblong orifices indicated by 1$^a$ to 10$^a$ inclusive. Through these orifices the meter bars 1 to 10 neatly pass. The plate is used as a means for supporting and holding the bars in place. It is preferably made of an insulating material, such as hard rubber, fiber or the like. As there is one of these supporting plates 30 secured to one end of each of the sections 16, the meter bars, 1 to 10 inclusive, are thus supported at sufficiently frequent intervals to retain them in place. Each of the porcelain blocks 22 of sections 16, are cut away on its sides, as at 31, to provide space for branches of the rectangular bus bar 32, which in this illustration is the neutral bus bar. Each of the branch circuit fuse sections 16, is provided with fuses and connections for two circuits, which I have indicated by capital letters as follows: Section 16 is for accommodation of circuit A and circuit B, the designating letters in each case being included within a circle 34 provided in the cover of each section. Section 16$^a$ serves branch circuits C and D, 16$^b$, circuits E and F; 16$^c$, circuits G and H; 16$^d$, circuits I and J; and 16$^e$, circuits K and L. Diagonally opposite receptacles are connected to a branch of bus bar 32, respectively, the shell 33 being connected by a short connector 32' and screw 35 as clearly shown in Fig. 4. Each of the porcelain blocks 22 of the branch circuit sections 16 is provided on each of its edges, below each of the respective fuse receptacles, with an orifice 36, communicating with the center of the shell 24, within which to insert a branch circuit conducting wire 37 which provides one leg of the branch circuit that is to be connected to the device.

Each of the sections 16 is provided with two switching arms 40 for coöperation with the meter bars 1 to 10 inclusive, there being one switching arm for each of the branch circuits contained on a given section. The switch arm 40 is pivoted to a vertical supporting post 41 upon the screw 42. The screw is threaded into the post 41, as at 43, and is secured in place by a check nut 44. The arm 40 is preferably hexagonal in cross section, as shown in Fig. 9. A washer 45 has two angular wings 46 which make contact with two angularly disposed sides of the hexagonal arm, pressure by the screw having a tendency to increase the intimacy of the contact. A similar washer 47 surrounds the screw 42 and is in intimate contact with the supporting post 41. These washers produce a resilient connection between the arm 40 and the post 41, which increases the conductivity or reduces the resistance of the joints between these two parts. The switch arm 40 is slotted where the screw 42 passes through it, as at 48, so that the arm 40 may be moved axially with reference to its pivotal support for a purpose to be hereinafter more fully explained.

The arm 40 also carries on its lower end, switch blades 49, for coöperative switching relation with the respective meter bars. An insulating handle, or knob 50, is secured to the upper end of the switch arm 40, by means of which the arm 40 may be moved upon its supporting axis. The arm also carries an indicator, or blade 51, pointed at one end, as at 52, and having the other end upturned, as at 53, and perforated as at 54, for a purpose to be hereinafter more fully described. The arm also carries an insulating ring 55 through which it loosely passes, as at 56. The switch arm supporting post 41 is held in place in a socket provided in the substantial transverse center of the segmental depression 26 by means of a screw 58 which is threaded into the lower end of the post and which passes through a strip 59, adapted to connect each post with diagonally disposed receptacles 24, each said strip being located in a depression 60 made in the lower surface of each porcelain block 22 and communicating with the interior of the depression provided for the receptacle 24. The strip 59 is connected to the shell of diagonally disposed receptacles by underlying the base flange of the shell, as clearly shown in Fig. 4.

All of the energizable portions of the sections 16 is inclosed by a removable insulating cover 61, provided with perforations 62, registering with the receptacles 24, to permit insertion of the fuse plugs 25, and downturned, at their respective edges, as at 66, the lower edge of the flanges 66 resting upon the shoulder 67 of the porcelain block 22. The cover is raised near its longitudinal center, as at 67, and is slotted for the reception of the insulating ring 55 that surrounds the switching arm 40. A tongue and groove relation, 68, with the cover keeps the ring 55 in place in the slot, and the ring closes the slot as the arm 40 is rotated upon the axial screw 42. The insulating cover 61 is also provided with a segmental flange 70, perforated, as at 72, for register with the perforations 54 carried in the indicator 51 when the arm 40 is in place for contact with the respective meter bars. At the base of the segmental flange 70 are a series of numbers, 1 to 10, inclusive, corresponding with the numbers of the meter bars, so that when the switch arm 40 makes contact with a given meter bar, the indicator 52 will be near the corresponding number at the base of the flange 70, which is near the arm 40. The arm is then moved in a radial and axial direction thereby to cause switch blades 49 to make contact with the meter bar when it may be held and retained in this position by means of a seal or lock 73, that passes through the perforations 54 of the upturned portion 53 and the corresponding perforation 72 on the flange 70 to prevent movement of the switch by unauthorized persons.

Terminal section 15 comprises a relatively thin slab or block of porcelain 74, having a vertically extending end 75. Mounted upon the block are supporting terminals 76, 77 and 78 attached to the neutral bus bar 32 and which help to hold it in place.

The cover 80 consists of the upwardly extending flange 81, for mutual coöperation with the cover of a section 16, and a downwardly extending flange 82 provided with perforations 83, for introduction of the wires to the terminals contained in said section.

Section 17 contains the laterally extending terminals for the meter bars. This section consists of a block 84 of porcelain, or similar insulating material, having a tapered central depression, somewhat similar to the depression 26 in the section 16, provided with similar serrations or projections against which the meter bars, 1 to 10 inclusive are adapted to rest. The meter bars, 1 to 10, inclusive are laid in radial positions in the depressions provided in the sections 16 to 16ᵉ, inclusive and the section 17, being held in place by passing through appropriate perforations in the plates 30. Each of the meter bars is connected by a laterally extending conducting bar 1ª to 10ª inclusive, respectively, provided on their ends with meter circuit terminals 86. Section 17 is inclosed by an insulating cover 87 provided with perforations or slots 88, in its lower edge registering with the respective terminals 86. Each of the laterally extending connecting bars, 1ª to 10ª inclusive, is secured to the porcelain block 84 of section 17 by means of screw 89, each of which is threaded into a nut 90 in a counterbored recess 91 made in the bottom of the block 84 and filled with suitable insulating material 92.

94, 95 and 96 are the respective plus neutral and minus terminals of a supply circuit connected through fuses 97, 98 and 99, respectively, with the three bladed switch 100. The switch connects the terminal 96 with the neutral bus bar 32 of my panel, by means of a wire 101 and connects the terminals 94 and 95 with the bus bars 102, 103, respectively.

104 is a meter, of which there is one shown in full lines and several others shown in dotted lines and of which there may be any desired number, up to the number corresponding to the number of meter bars represented in the composite panel. For each three-wire meter that may be used at least two meter bars must be used. One terminal of each of the meters shown is connected to a separate fuse, 106, and thereby to the bar 103 or to a fuse 107 and thereby to the bar 102, as the case may be. The other terminal of the meter, is connected, as by wire 108, to one of the meter bars. The meter shown in full lines being connected to the meter bar 1. the meter thereabove, shown in dotted lines, being connected in a similar manner to the meter bar 2, and the meter above that being connected to the meter bar 3, whereas the meter 104 on the opposite side of the diagram, is connected to bar 10, the one immediately thereabove would be connected to the meter bar 9 and so on until the full number of meters, preferably equal to the number of meter bars or branch circuits has been thus connected. The central or potential terminal of each of the meters 104 is connected to the neutral bus bar 32, as by wire 110.

Now tracing the circuits through the meter 104, shown in full lines at the lower right hand corner of the diagram of circuits in Fig. 10,—current will pass from the neutral terminal 96, through the central switch blade, of the switch 100, through the wire 101 to the neutral branched bus bar 32 and over and through said bus bar, over the connector 32′ to the shell 24 and to the circuit C through the fuse contained in the receptacle to the central contact 111 of said receptacle, over the positive wire 37ᶜ through the translating devices 110, that may be contained in said branch circuit at the time, and by the negative wire 37ᶜ back to the other fuse receptacle on the same section to the central contact 111 of said shell over the connector 59ᶜ to the post 41 which supports the switch arm 40—the switch arm 40 having first been placed in connection with the meter bar 1,—through the meter bar 1, over the wire 108, to the meter 104, shown in full lines, and over the wire 105 through the fuse 106, to the terminal bus bar 103, and through the right hand blade 101 of the switch, and the fuse 99 to the negative bus bar 95, thus completing the branch circuit C through meter 104 and through the meter bar 1. Now if the circuit be traced through the meter 104, shown in dotted lines on the left hand side of the diagram, it will be observed that it is connected in the same manner with branch circuit E and that grouped with the circuit E is the circuit A, the circuit A and circuit E being both on the same meter, and in this manner any circuit may be connected to any given meter or any given number of circuits may be grouped with a single meter.

To operate the switch arm 40 so that it may be shifted to any one of the meter bars, 1 to 10 inclusive, it is first necessary to seize the knob 50 and pull it outwardly in a radial direction, to disconnect it, the slot 48 containing the screw 42 will permit such movement, until the switch blades 49 have left contact with the particular meter bar with which it was at the time connected, then the switch arm 40 may be rotated upon the bearing screw 42 until the pointer 52 indicates, on the outside of the cover, as at 70', the number of the switch bar to which connection is desired to be made, at which time the switch arm 50 is moved axially inwardly until the switch blades 49 make contact with the desired meter bar. The slot 48 permits the switch arm 40 to be withdrawn sufficiently so that the switch blades 49 will not make contact with any of the meter bars, 1 to 10 inclusive, when the switch arm 40 is being rotated upon its axis, into a new position, so that none of the circuits, associated with the particular one being operated, are interfered with in any manner by the movement of any one of the switches.

The central wire connecting contact 111, shown in the receptacles 24, forms subject matter for my copending application Serial No. 41,827, filed July 26, 1915, and therefore specific description has not been included in this specification.

From the foregoing description it will be readily understood that a meter panel switch board of any desired capacity may be built up, from the standard stock sections that may be made and kept on hand, so that when an order is received for a board, it is only necessary to assemble the parts, that it may be quickly produced and made ready for shipment within a very short time after receipt of the order, with greatly increased construction efficiency.

While I have herein shown a specific construction, for the purpose of clear disclosure, it will be readily understood that many changes may be made in the arrangement, configuration and disposition of the parts within the scope of the appended claims.

Having described my invention, what I claim is:—

1. A composite panel board comprising a plurality of like fuse receiving branch-circuit sections, each section having a plurality of fuse receptacles and a rotatably movable switch member for each branch circuit; a plurality of continuous, parallel conducting bars extending through all said sections radially disposed with reference to the axes of said switch members for coöperation with said switch members, whereby any one of said bars may be connected to any one of said branch circuits by the respective switches; and a bus bar, on each side of said sections, connected to certain of the conducting parts of said receptacles to hold said assembled sections together.

2. A composite panel board comprising a plurality of fuse receiving branch circuit sections; a movable switch member for each branch-circuit pivoted to each said section; a plurality of continuous generally parallel meter bars extending through all said sections radially arranged from the axis of said switch members for coöperation therewith, and below the face thereof, whereby any one of said bars may be connected through any one of said fuse receiving devices by the respective switch members; and separate insulating covers for each section overlying all metal parts thereof.

3. A composite panel board comprising a plurality of like branch circuit sections, each section having a plurality of threaded fuse receptacles and a movable switch member for each branch circuit; a plurality of generally parallel conducting bars extending to and supported by said section for coöperation with said switch members whereby any one of said bars may be connected to any one of said branch circuits; wire coiling and binding screws for branch circuits constituting the central contacts for said fuse receptacles one within each receptacle and a base upon which the parts of the section are mounted, perforated to permit insertion of a wire in each receptacle to be coiled and clamped by said binding screws.

4. A branch circuit section for a sectional panel board comprising a block of insulating material having a depression for fuse receptacles, one on each side of its median plane; screw threaded receptacles in said depression; said block having below its surface an arcuate depression intermediate said receptacles; supports in said arcuate depressions for a plurality of spaced apart radially disposed bars to maintain said bars at substantially equal distances from the axis of said arcuate depression and a switch member pivoted at said axis for coöperation with said bars.

5. A branch circuit section for a sectional panel board comprising a block of insulating material having a depression for fuse receptacles, one on each side of its median vertical plane; screw threaded receptacles in said depressions, the center contact of which serves as a binding clamp for the service wires to be connected thereto; said block having below its face an arcuate depression intermediate said receptacles; supports in said arcuate depressions for a plurality of spaced apart radially disposed bars to maintain said bars at substantially equal distances from the axis of said arcuate depressions, a switch member pivoted at said axis for coöperation of said bars and a cover of insulating material overlying the conducting parts of said block and extending over part of the side vertical edges thereof.

6. A branch circuit section for a sectional panel board comprising a block of insulating material having an arcuate or circular concaved depression in its face near its central zone; two plug fuse receptacles on each side of said depression; a vertically extending post in the midst of said depression; a radially movable swinging switch arm pivoted to said post near the axis of said depression; a plurality of bars spaced apart radially disposed and held in said depression for coöperation with said switch arm; an insulating cover, slotted to permit said arm to pass therethrough, overlying said depressions and a slide, movable with said arm to close the slot.

7. A branch circuit section for a sectional panel board comprising a block of insulating material having an arcuate or circular concaved depression in its face near its central zone; two plug fuse receptacles on each side of said depression; a post extending to the axis of said receptacle to support the switch arm; a radially movable swinging switch arm pivoted to said post near the axis of said depression; a plurality of bars spaced apart radially disposed in said depression for coöperation with said switch arm; an insulating cover slotted to permit said arm to pass therethrough, overlying said depressions; a slide movable with said arm to close the slot; a pointer carried by the arm and coöperating indications on the cover to indicate the position of the selected bar with reference to said switch arm.

8. A branch circuit section for a sectional panel board comprising a block of insulating material having an arcuate or circular concaved depression in its face near its central zone; fuse receptacles; in multiples of two, on each side of said depression; a radially movable and swinging switch arm, one for each two of said receptacles, pivoted to a support near the axis of said depression; a plurality of bars spaced apart and held in radial planes in said depressions for coöperation with said switch arm; an insulating cover, slotted to permit said arms to pass therethrough overlying said depressions, a slide, movable with each said arm to close the respective slots; a pointer carried by each arm; coöperating indications on the cover to indicate the position of the selected bar with reference to the moved switch arm and means to seal or lock said arm in selected position.

In testimony whereof I hereunto set my hand in the presence of two subscribing witnesses.

JOHN CUTHBERT.

In the presence of—
MARY F. ALLEN,
FORÉE BAIN.